(12) United States Patent
Takenouchi

(10) Patent No.: US 7,405,841 B2
(45) Date of Patent: Jul. 29, 2008

(54) IMAGE PROCESSING DEVICE, IMAGE PROCESSING METHOD AND IMAGE PROCESSING PROGRAM

(75) Inventor: Yoshikuni Takenouchi, Sagamihara (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 897 days.

(21) Appl. No.: 10/809,439

(22) Filed: Mar. 26, 2004

(65) Prior Publication Data
US 2005/0175259 A1 Aug. 11, 2005

(30) Foreign Application Priority Data
Feb. 9, 2004 (JP) ............... 2004-032668

(51) Int. Cl.
*G06F 15/00* (2006.01)
*G03G 15/00* (2006.01)
(52) U.S. Cl. ........................ 358/1.18; 399/24
(58) Field of Classification Search ............... 358/1.18, 358/448, 1.13; 235/454, 462.41; 399/24, 399/27, 45, 150, 366; 434/322; 422/63, 422/65; 725/31, 135; 101/395; 382/182, 382/305
See application file for complete search history.

(56) References Cited
U.S. PATENT DOCUMENTS
6,650,794 B1 * 11/2003 Aoki .......................... 382/306
2001/0044798 A1 * 11/2001 Nagral et al. ............... 707/102

FOREIGN PATENT DOCUMENTS
| JP | A-03-175075 | 7/1991 |
| JP | 2000-115422 | 4/2000 |
| JP | 2001-028726 | 1/2001 |
| JP | 2001-313766 | 11/2001 |
| JP | 2002-337426 | 11/2002 |

OTHER PUBLICATIONS

Notification of Reason for Refusal mailed by the Japanese Patent Office on Mar. 7, 2006, for Japanese Patent Application No. 2004-032668, and an English-language translation thereof.
Decision of Rejection mailed by the Japanese Patent Office on May 30, 2006, for Japanese Patent Application No. 2004-032668, and an English-language translation thereof.

* cited by examiner

Primary Examiner—Saeid Ebrahimi Dehkordy
(74) Attorney, Agent, or Firm—Finnegan, Henderson, Farabow, Garrett & Dunner, LLP

(57) ABSTRACT

MFP 100 obtains document image data by reading an image of an IC-tagged document by means of image scanning unit 150, and writes it into the IC tag of the document as archive information of the document image by means of IC-tagged reading/writing unit 140. It also writes the differential image data obtained by extracting the difference between the document image data and the image data related to the archive information stored in the IC tag of the document as the archive information of the document image. Moreover, MFP 100 is capable of reading the desired archive information from the IC tag of the document, and printing or deleting it. This makes it possible to accumulate and use the archive information of the document image in the document itself when the document image is updated multiple times by handwriting notes, etc.

9 Claims, 14 Drawing Sheets

IC TAG IS DETECTED ON THE DOCUMENT.
DO YOU WISH TO USE ARCHIVE INFORMATION?

YES            NO

| ARCHIVED DATE/TIME | SAVING TYPE | TITLE | DOCUMENT SIZE | RESOLUTION | SCAN MODE | IMAGE DATA |
|---|---|---|---|---|---|---|
| 2003/09/03 | DIFFERENCE | 3RD MEETING | A4 | 200dpi | MONOCHROMATIC | ...... |
| 2003/08/13 | TOTAL | MEETING MATERIALS (REV) | A4 | 400dpi | COLOR | ...... |
| 2003/08/08 | DIFFERENCE | 2ND MEETING | A4 | 200dpi | MONOCHROMATIC | ...... |
| 2003/07/03 | DIFFERENCE | 1ST MEETING | A4 | 200dpi | MONOCHROMATIC | ...... |
| 2003/05/03 | TOTAL | MEETING MATERIALS | A4 | 400dpi | COLOR | ...... |

FIG.13
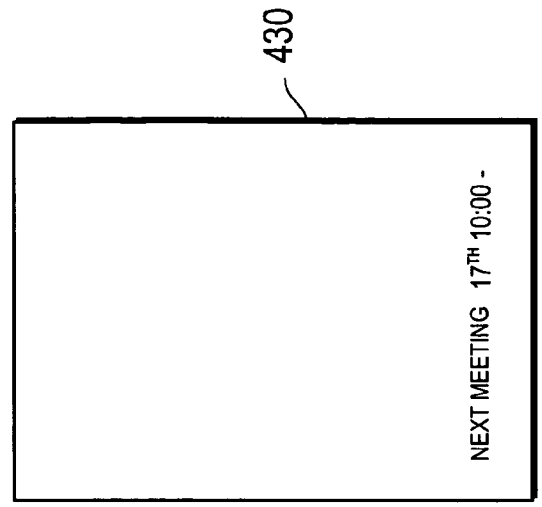
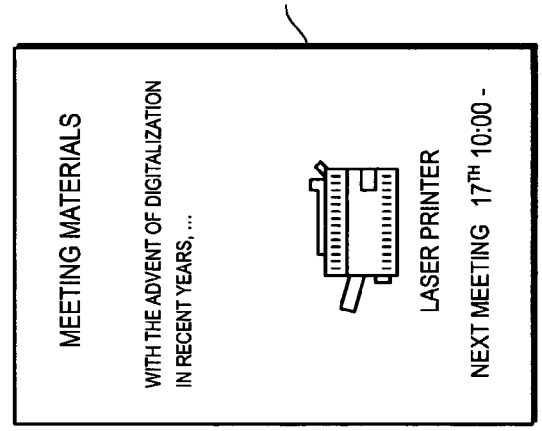
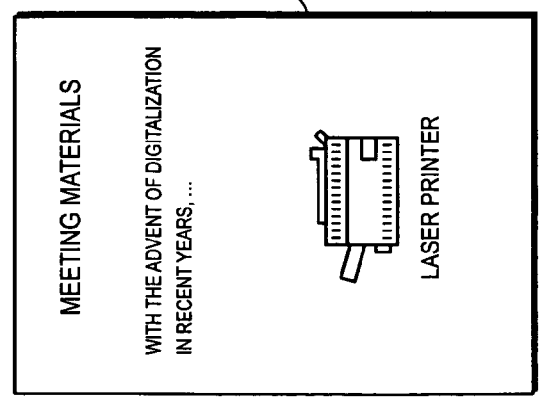

IMAGING OUTPUT WILL NOW BE EXECUTED. PLEASE SPECIFY ARCHIVING
INFORMATION TO BE ISSUED AND PRESS START BUTTON.

2003/09/03
2003/08/13
2003/08/08
2003/07/03
2003/05/03

SAVING METHOD
　　　　　：DIFFERENCE SAVING

TITLE　：3RD MEETING

DOCUMENT SIZE　：A4

RESOLUTION　：200dpi

SCANNING MODE
　　　　　：MONOCHROMATIC

ARCHIVE DELETION WILL NOW BE EXECUTED. PLEASE SPECIFY
ARCHIVING INFORMATION TO BE DELETED AND PRESS START BUTTON.

2003/09/03
2003/08/13
2003/08/08
2003/07/03
2003/05/03

SAVING METHOD
　　　　　：DIFFERENCE SAVING

TITLE　：3RD MEETING

DOCUMENT SIZE　：A4

RESOLUTION　：200dpi

SCANNING MODE
　　　　　：MONOCHROMATIC

THE FOLLOWING ARCHIVE INFORMATION WILL BE DELETED. IF IT IS CORRECT, PLEASE PRESS START BUTTON.

2003/09/03

SAVING METHOD
: DIFFERENCE SAVING

TITLE : 3RD MEETING

DOCUMENT SIZE : A4

RESOLUTION : 200dpi

SCANNING MODE : COLOR

THE FOLLOWING ARCHIVE INFORMATION WILL BE DELETED. IF IT IS CORRECT, PLEASE PRESS START BUTTON.

2003/09/03
2003/08/13

SAVING METHOD
: TOTAL SAVING

TITLE : MEETING MATERIALS
(REV)

DOCUMENT SIZE : A4

RESOLUTION : 400dpi

SCANNING MODE : COLOR

IMAGE PROCESSING DEVICE, IMAGE PROCESSING METHOD AND IMAGE PROCESSING PROGRAM

This application is based on Japanese Patent Application No. 2004-032668 filed on Feb. 9, 2004, the contents of which are hereby incorporated by reference.

BACKGROUND OF THE INVENTION

1. Field of the Invention

The invention relates to an image processing device for handling documents equipped with an electronic tag, in particular, an image processing device capable of accumulating archive information of document image on the document itselfe to be used as the document is updated several times by means of handwritten notes, etc., 2. Description of Related Art There are occasions wherein the images of a document are updated several times by means of handwritten notes and other means and it is desirable to obtain the original images or images at each updating. In such a case, the common practice has been to print the original images and updated images in each case and file them, which ends up in a substantial waste of paper and filing spaces.

In contrast, an image processing device is known for transmitting the images obtained by scanning the updated document images to and store them in a server as archive information (e.g., JP-2000-115422A). However, it is necessary to access the server via a network and the like in such a device, so that it is incapable of speedy processing, and also that it cannot be used in an environment which lack network facilities.

On the other hand, printed matters that hold the attribute information thereof on themselves by using printing paper with an IC tag, which is embedded in a certain part of printing paper, and image forming devices that allow the uses to use the attribute information by reading it from the IC tag during the printing process have been known (e.g., JP-2001-24845A). However, even in case of those printed matters or devices, it is impossible to use images of previous updates when an image has been updated multiple times by means of handwritten notes, etc.

SUMMARY OF THE INVENTION

The present invention is made to solve the abovementioned problems of the prior art, and its purpose is to provide an image processing device capable of accumulating archive information of document images on the documents themselves to be used as the documents are updated several times by means of handwritten notes, etc.

Said objective of the present invention can be accomplished by the following means:

(1) An image processing device comprising: a scanning unit for obtaining image data by scanning a document image of a document wherein an image is formed on an electronically tagged paper equipped with an electronic tag for storing electronic data in a certain part of the paper; and a writing unit for writing the image data obtained by said scanning unit on the electronic tag of the document as archive information of the document image.

(2) An image processing device comprising: a reading unit for reading archive information from an electronic tag of a document wherein an image is formed on an electronically tagged paper equipped with the electronic tag for storing electronic data in a certain part of the paper and the electronic tag stores the archive information of the document image; a selecting unit for selecting an archive information to be printed among the archive information read by said reading unit; and a printing unit for printing image data related to the archive information selected by said selecting unit.

(3) An image processing device comprising: a reading unit for reading archive information from an electronic tag of a document wherein an image is formed on an electronically tagged paper equipped with the electronic tag for storing electronic data in a certain part of the paper and the electronic tag stores the archive information of the document image; a selecting unit for selecting an archive information to be deleted among the archive information read by said reading unit; and a deleting unit for deleting the archive information selected by said selecting unit.

(4) An image processing method comprising: a scanning step of obtaining image data by scanning a document image of a document wherein an image is formed on an electronically tagged paper equipped with an electronic tag for storing electronic data in a certain part of the paper; and a writing step of writing the image data obtained by said scanning step on the electronic tag of the document as archive information of the document image.

(5) An image processing method comprising: a reading step of reading archive information from an electronic tag of a document wherein an image is formed on an electronically tagged paper equipped with the electronic tag for storing electronic data in a certain part of the paper and the electronic tag stores the archive information of the document image; a selecting step of selecting an archive information to be printed among the archive information read by said reading step; and a printing step of printing image data related to the archive information selected by said selecting step.

(6) An image processing method comprising: a reading step of reading archive information from an electronic tag of a document wherein an image is formed on an electronically tagged paper equipped with the electronic tag for storing electronic data in a certain part of the paper and the electronic tag stores the archive information of the document image; a selecting step of selecting an archive information to be deleted among the archive information read by said reading step; and a deleting step of deleting the archive information selected by said selecting step.

(7) An image processing program for causing an image processing device to execute: a scanning step of obtaining image data by scanning a document image of a document wherein an image is formed on an electronically tagged paper equipped with an electronic tag for storing electronic data in a certain part of the paper; and a writing step of writing the image data obtained by said scanning step on the electronic tag of the document as archive information of the document image.

(8) An image processing program for causing an image processing device to execute: a reading step of reading archive information from an electronic tag of a document wherein an image is formed on an electronically tagged paper equipped with the electronic tag for storing electronic data in a certain part of the paper and the electronic tag stores the archive information of the document image; a selecting step of selecting an archive information to be printed among the archive information read by said reading step; and a printing step of printing image data related to the archive information selected by said selecting step.

(9) An image processing program for causing an image processing device to execute: a reading step of reading archive information from an electronic tag of a document wherein an image is formed on an electronically tagged paper equipped with the electronic tag for storing electronic data in a certain part of the paper and the electronic tag stores the archive information of the document image; a selecting step of selecting an archive information to be deleted among the archive information read by said reading step; and a deleting step of deleting the archive information selected by said selecting step.

BRIEF DESCRIPTION OF THE DRAWINGS

FIG. 9 is an example screen to be displayed on a touch panel of operating unit 130 of MFP 100.

FIG. 10 is an example of archive information table to be read out by MFP 100 from the IC tag of the document.

FIG. 13 is a conceptual drawing for describing the archiving mode of MFP 100.

FIG. 15 is an example screen to be displayed on a touch panel of operating unit 130 of MFP 100.

FIG. 16 is an example screen to be displayed on a touch panel of operating unit 130 of MFP 100.

FIG. 17 is an example screen to be displayed on a touch panel of operating unit 130 of MFP 100.

FIG. 18 is an example screen to be displayed on a touch panel of operating unit 130 of MFP 100.

DESCRIPTION OF THE PREFERRED EMBODIMENTS

The preferred embodiments of the invention will be described in detail below with reference to the accompanying drawings.

Figure 1:
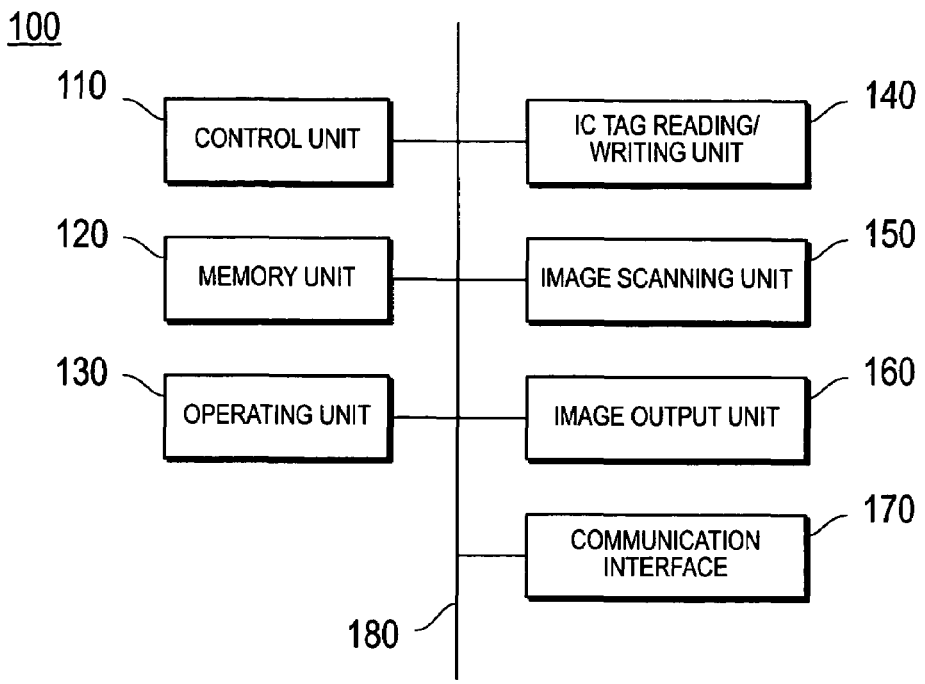
FIG. 1 is a block diagram showing the constitution of a MFP 100 according to the present embodiment.
Figure 2:
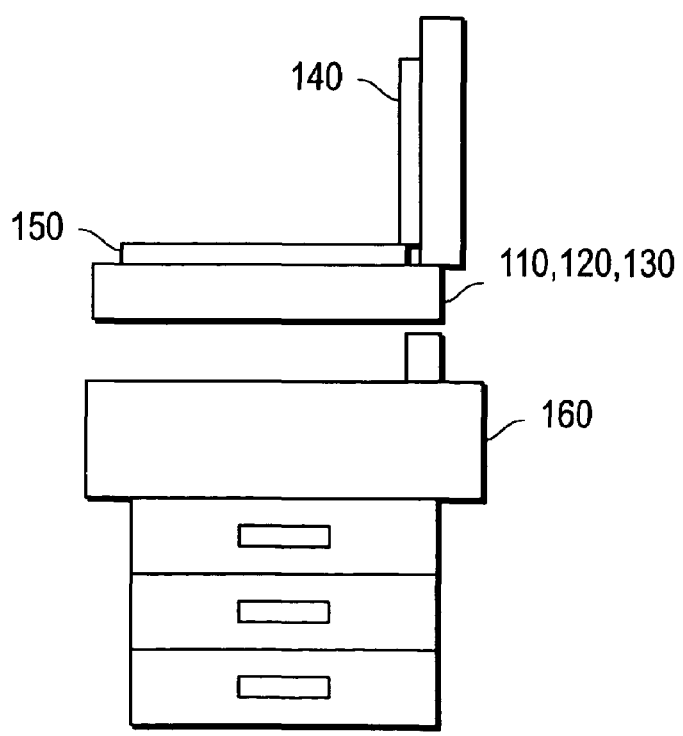
FIG. 2 is a block diagram showing the constitution of MFP 100.

FIG. 1 and FIG. 2 are the block diagram and the schematic diagram of MFP (Multiple Function Peripheral) 100 as an image processing device of the embodiment of the present invention. As can be seen from FIG. 1 and FIG. 2, MFP 100 is equipped with a control unit 110, a memory unit 120, an operating unit 130, an IC tag reading/writing unit 140, an image scanning unit 150, a printing unit 160, and a communication interface 170, all of which are interconnected to exchange signals with each other via bus 180.

Control unit 110 is a CPU, and controls various parts indicated above and executes various arithmetic processes according to a program.

Memory unit 120 includes a ROM for storing various programs and parameters, a RAM for temporarily storing programs and data as a working area, a hard disk used for storing various programs and parameters or temporarily saving image data obtained from image processing, and others.

Operating unit 130 consists of a touch panel for displaying various information and entering various setup inputs, a ten key pad for setting up the number of copies to make and others, a start key for instructing the operation to start, a stop key for instructing the operation to stop, various fixed keys such as a reset key for initializing various setup conditions, indicator lamps, etc.

IC tag reading/writing unit 140 reads the electronic data recorded on a non-contact type IC tag of an IC-tagged document to be described later or writes electronic data on said IC tag. As the communication system between IC tag reading/writing unit 140 and the IC tag, those of the international standards such as ISO 14443 and ISO 15693 can be applied using frequency bands such as 135 kHz, 13.56 MHz, and 2.45 GHz. However, the communication systems that can be applied are not limited to those mentioned above, and other known communication systems or proprietary communication systems may be used. IC tag reading/writing unit 140 may be able to read all the electronic data recorded on a plurality of IC tags within the communicable range simultaneously. In order to prevent IC tag reading/writing unit 140 from detecting by mistake IC tags existing in the vicinity of MFP 100, other than the tags of the IC-tagged document set on document table, it is designed specifically for short distance communications within a proper distance range, for example, within several millimeters to several tens of centimeters.

Image scanning unit 150 irradiates a document set on the specified scanning position of the document table with a light source such as a fluorescent lamp and the like, converts reflected lights from the document surface into electrical signals with the help of light sensitive devices such as CCD or CIS, and generates image data (bitmap data) from the electrical signals.

Printing unit 160 prints image data on printing paper by the electronic photography method through the steps of electrostatic charging, exposure, development, transfer and fixing. However, the printing method of printing unit 160 in this invention is not limited to this, and methods such as the impact method, thermal transfer method, inkjet method, etc. can be used in addition to the electronic photography method.

Communication interface 170 is an interface for input and output of information such as image data to or from external equipment, for which local connection interfaces, e.g., network interfaces such as Ethernet®, Token Ring, and FDDI standards, serial interfaces such as USB and IEEE 1394, parallel interfaces such as SCSI, IEEE 1284, and wireless communication interfaces such as Bluetooth, IEEE 802.11, HomeRF, IrDA, as well as telephone circuit interfaces for connection to telephone circuits can be used.

Because of the abovementioned constitutions, MFP 100 has all the functions such as a scanner for scanning the document and transmitting image data to external equipment, as a printer for printing the image data received from external equipment, as a copying machine for scanning the document image and printing the image data, and as a facsimile machine for receiving and transmitting image data through telephone circuits. However, MFP 100 may contain constitutional elements other than those described above, or may not include a portion of the abovementioned elements.

Figure 3:
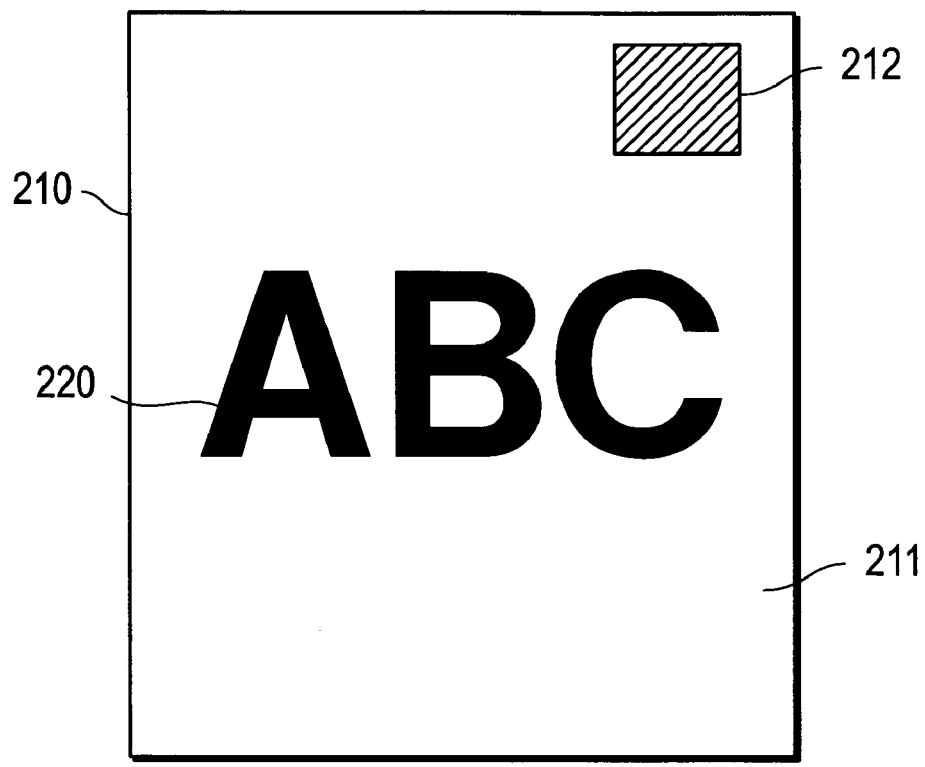
FIG. 3 is a schematic diagram showing a constitution of an IC-tagged document 200.

Next, let us describe the IC-tagged document according to this embodiment referring to FIG. 3. FIG. 3 is a schematic diagram showing a constitution of an IC-tagged document 200 according to this embodiment. As shown in FIG. 3, IC-tagged document 200 consists of an image 220 formed on IC-tagged printing paper 210 on which an IC tag 212 is embedded in a certain part of printing paper 211.

Printing paper 211 is a printing medium of a sheet form made of paper, cloth, plastic material, metal or others. IC tag 212 is a non-contacting type electronic tag using wireless communication equipped with a memory unit (not shown) consisting of IC chips and an antenna unit (not shown) consisting of a coil built inside the chip, conducts wireless communications with IC tag reading/writing unit 140 by means of electromagnetic induction coupling receiving radio waves emitted by IC tag reading/writing unit 140 to read and write electronic data. With the development of minute IC tags with a typical thickness of 0.25 mm, which can be embedded in printing paper, in recent years, it is expected that a large amount of information will soon be stored in IC tags as the memory capacities of IC chips are increasing rapidly. However, the electronic tag used in the present invention is not limited to any specific type of tags as long as it has a communication interface for transmitting and receiving electronic data and has a memory unit for storing electronic data, and even a contact type IC tag that communicates through a contact point type communication interface can be used as well in addition to the abovementioned non-contact type IC tag.

The electronic data is written in the XML format in the memory unit of IC tag 212, storing the attribute information of IC-tagged document 200, such as the document ID specific to the printed matter, page number, copying approval or prohibition information, as well as the image data of the image formed on IC-tagged printing paper 210. However, the format of the information recorded as electronic data on IC tag 212 and the format of the electronic data are not limited to those examples.

Further, IC-tagged printing paper 210 shown in FIG. 3 is not limited to the format shown in the figure; for example, IC tag 212 can be as large as to cover substantially the entire surface of printing paper 211, or a plurality of IC tags 212 are distributed substantially over the entire surface of printing paper 211 to be embedded therein.

Figure 4:
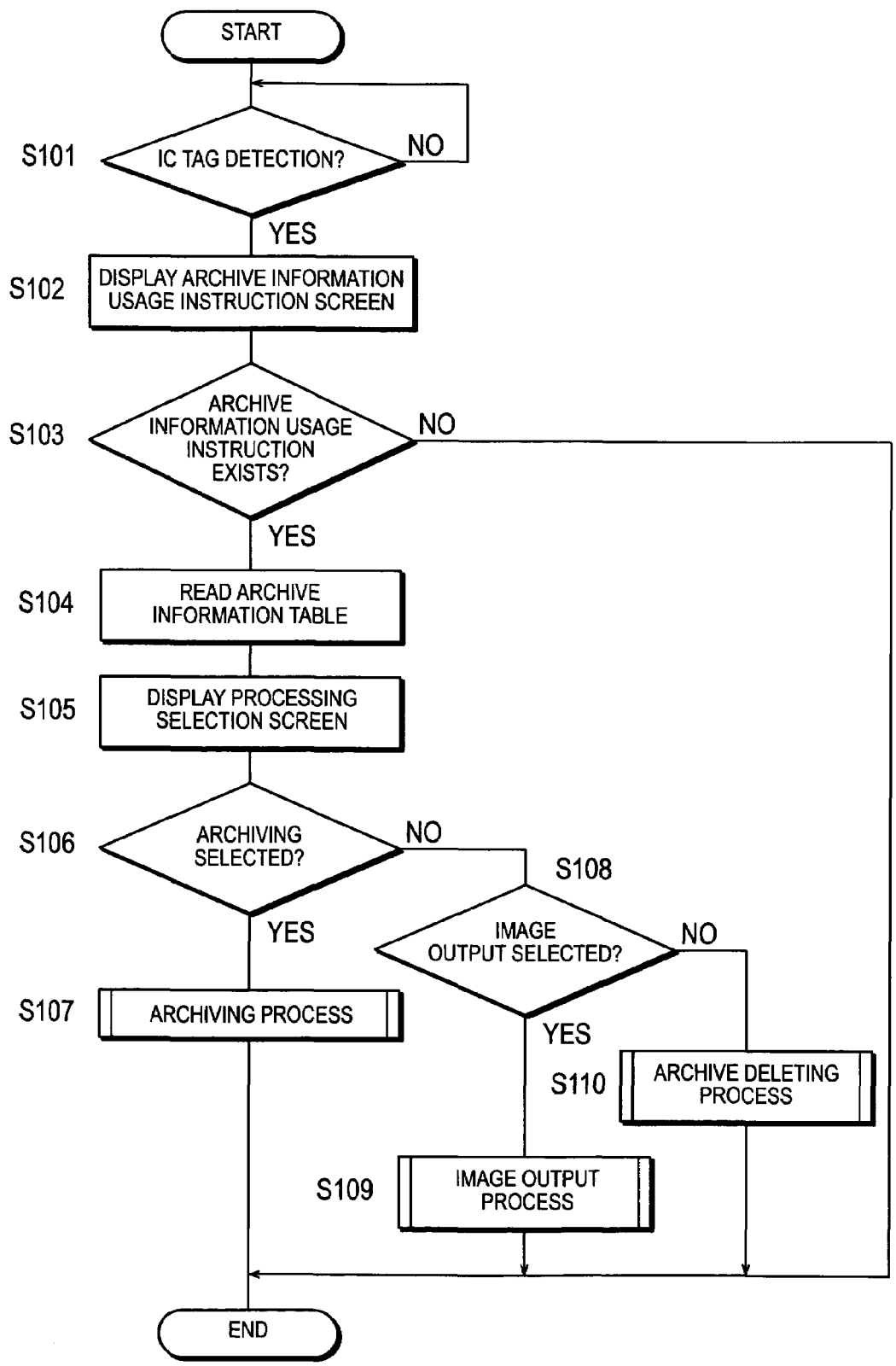
FIG. 4 is a flowchart showing the sequence of image processing by means of MFP 100.

Next, the outline of MFP 100 according to this embodiment will be described below. FIG. 4 is a flowchart showing the image forming process of MFP 100 according to this embodiment. The algorithm indicated by the flowchart of FIG. 4 is stored as a control program on memory 120 of MFP 100, read out and executed by control unit 110 when the operation starts.

In FIG. 4, MFP 100 stands by until an IC tag is detected by IC tag reading/writing unit 140 (S101: No). When an IC-tagged document is set on the document table by the user, MFP 100 detects the IC tag of the document by IC tag reading/writing unit 140 (S101: Yes), displays an archive information usage instruction screen on the tough panel of operating unit 130 as shown in a screen 310 of FIG. 9 (S102), and receives an instruction input concerning whether to use the archive information or not (S103).

If there is an input instructing not to use the archive information in step S103 (S103: No), the image process is terminated. On the other hand, if there is an input instructing to use the archive information in step S103 (S103: Yes), the archived information table containing the archive information of the document image concerning the document, which is stored in the IC tag of the document, is read out to memory unit 120 by means of IC tag reading/writing unit 140 (S104). FIG. 10 is an example of archive information table to be read out by MFP 100 from the IC tag of the document in this embodiment. As shown in FIG. 10, archive information table 100 contains the archive information of the document such as document image data, archived date, saving format, title, document size, resolution, and scan mode. As can be seen from the above, saving the document image data obtained by scanning the document image in the IC tag each time when the document image is updated, updating archive information of the document image can be accumulated on the document itself. This makes it unnecessary to print the updated document image and file it each time the document image is updated, thus making it possible to avoid the waste of paper resources and filing spaces, as well as to manage the updating archive information of the document images without using a server and the like, to process more speedily as it is unnecessary to access the network, and to use the archive information even in an environment where no network facility is available.

Figure 11:
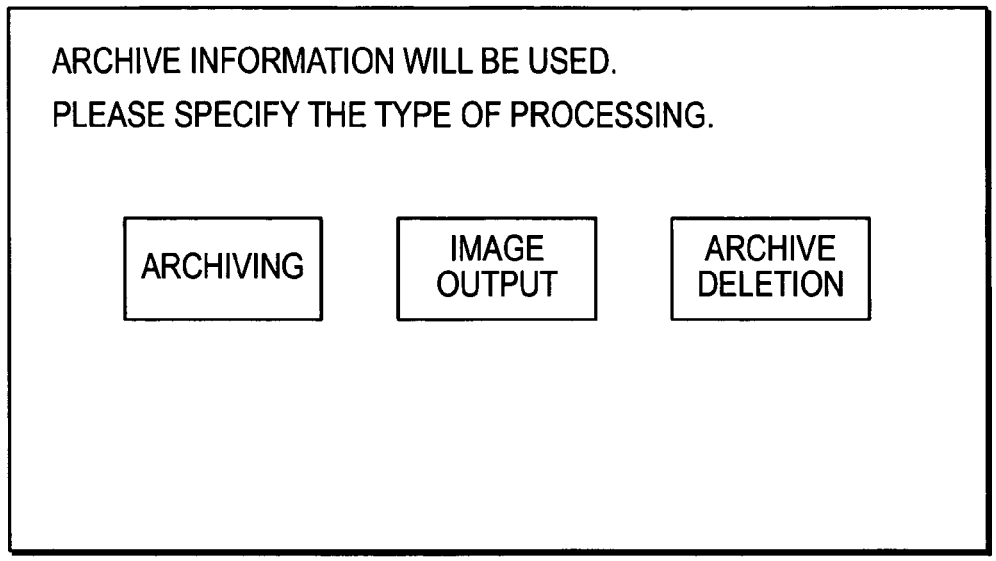
FIG. 11 is an example screen to be displayed on a touch panel of operating unit 130 of MFP 100.

Next, as shown in a screen 320 of FIG. 11, an archive information processing selection screen is displayed on the touch panel of operating unit 130 (S105), and a selection input is received for processing the archive information (S106). MFP 100 is so constituted that the process for archive information can be selectively entered either as "Archiving" for storing the new archive information, "Image output" for issuing the image related to the stored archive information, or "Archive deletion" for deleting the stored archive information as shown in a screen 320.

Figure 5:
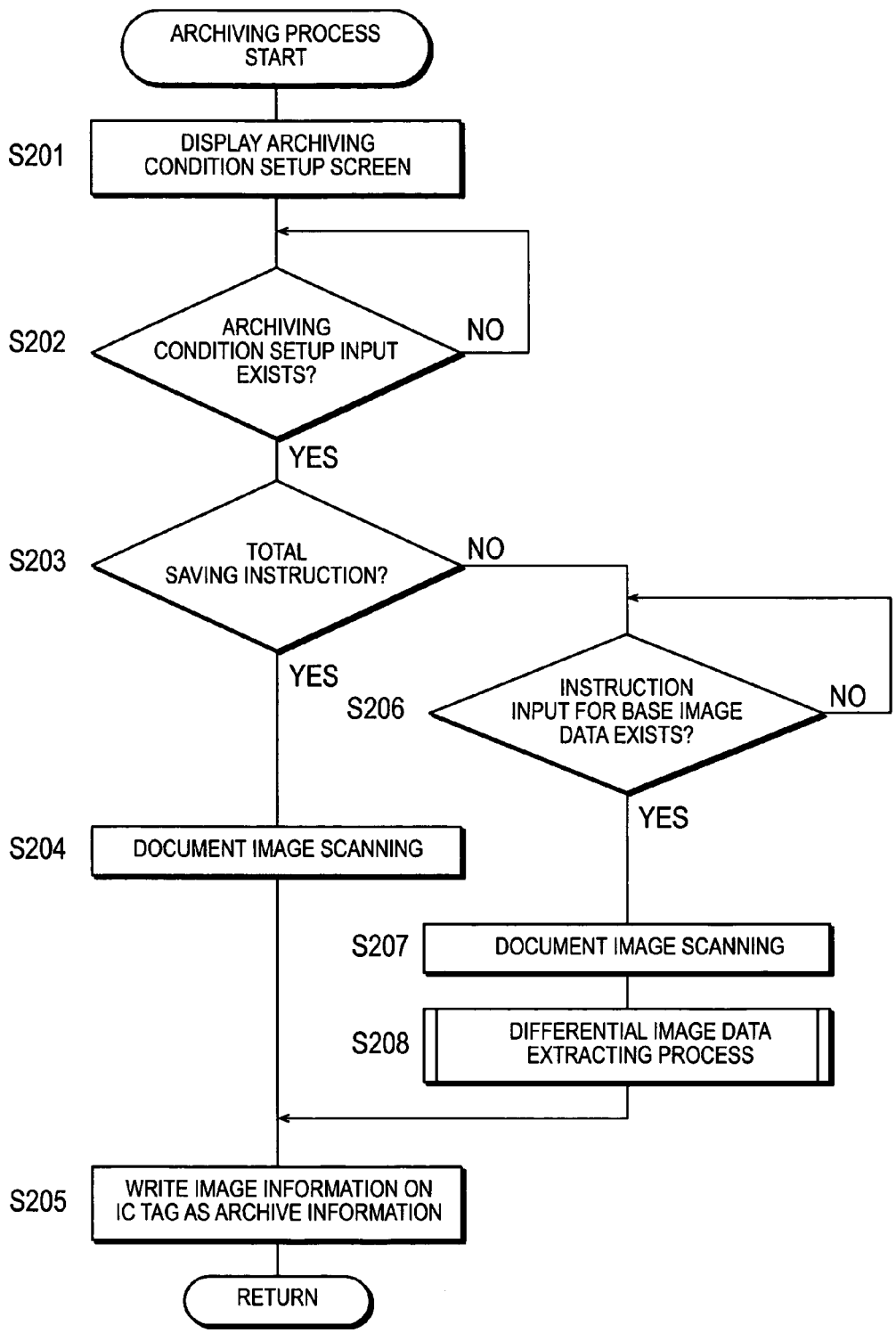
FIG. 5 is a flowchart showing the sequence of archiving process of MFP 100 shown in FIG. 4.
Figure 12:
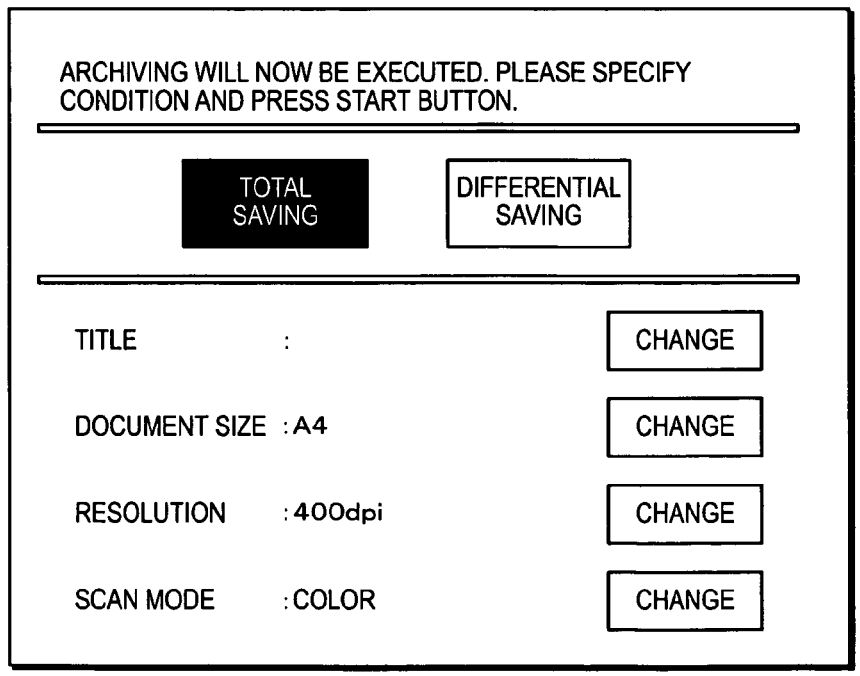
FIG. 12 is an example screen to be displayed on a touch panel of operating unit 130 of MFP 100.

If there is a selection input for the archiving process in step S106 (S106: Yes), the archiving process is executed (S107). FIG. 5 is a flowchart for describing the sequence of archiving process that is executed by MFP 100 in this embodiment. In FIG. 5, MFP 100 displays an archiving condition setup screen on the touch panel of operating unit 130 as shown in a screen 330 of FIG. 12 (S201), and stands by until the setup input for the archiving condition is received (S202: No). MFP 100 is constituted in such a way as to be able to set up the archiving condition such as archive saving mode, title, document size, resolution, and scan mode as shown in screen 330.

As the archiving mode, either "total saving" or "differential saving" mode can be specified by an instruction input. The total saving mode is a mode for saving the document image data by optically scanning the document as archive information, while the differential saving mode is a mode that saves as the archive information the differential image data obtained by extracting the difference of the document image data obtained by optically scanning the document image based on the totally saved image data related to the desired archive information.

FIG. 13 is a conceptual drawing for describing the archiving mode of MFP 100 in this embodiment. In FIG. 13, a base image data 410 is an image data archived in the IC tag of the document according to a total saving mode, and a document image data 420 is an image data obtained newly by optical scanning the document image in the archiving process. When the archiving process is executed by the total saving mode, document image data 420 is stored in the IC tag of the document as archive information as is. Moreover, when the particular archiving process is executed in the differential saving mode with base image data 410 as the basis of the differential extraction, a differential image data 430 extracted as a difference between base image data 410 and document image data 420 is stored in the IC tag of the document as the archive information.

When there is a set up input of the archiving condition in step S202 (S202: Yes) and the total saving is specified as the archive mode (S203: Yes), the document image data is obtained by means of image scanning unit 150 (S204), and the obtained document image data is written on the IC tag of the document as the archive information by means of IC tag reading/writing unit 140 together with the archiving condition (S205) to complete the archiving process.

On the other hand, if the differential saving is specified in step S203 as the archiving mode (S203: No), MFP 100 displays an archive information specifying screen (not shown)

on the touch panel of operating unit 130, and stands by until specifying input is received for the archive information concerning the base image data which is used as the basis for the difference extraction (S206: No). When a specifying input for the archive information, which is used as the basis, is received (S206: Yes), the document image data is obtained by scanning the document image by means of image scanning unit 150 according to the archiving condition specified in step S202 (S207), and the differential image data is extracted from the obtained document image data (S208)

Figure 6:
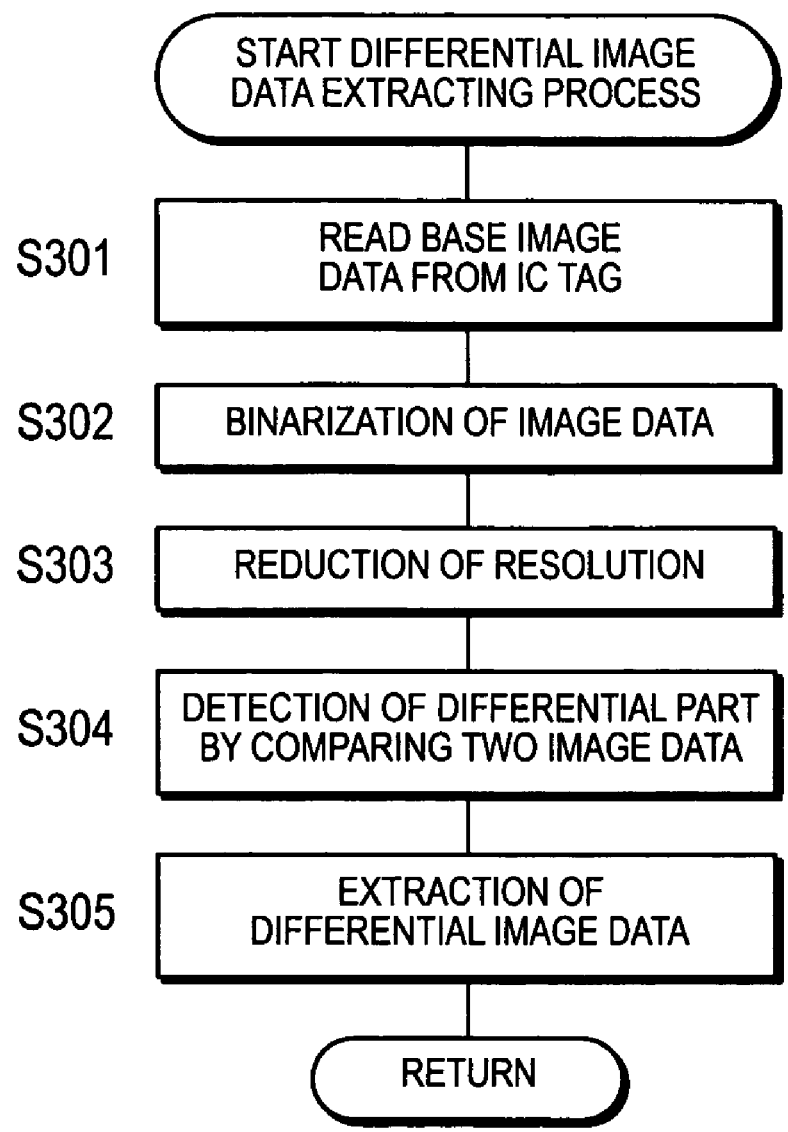
FIG. 6 is a flowchart showing the differential image data extracting process of MFP 100 shown in FIG. 4.
Figure 14:
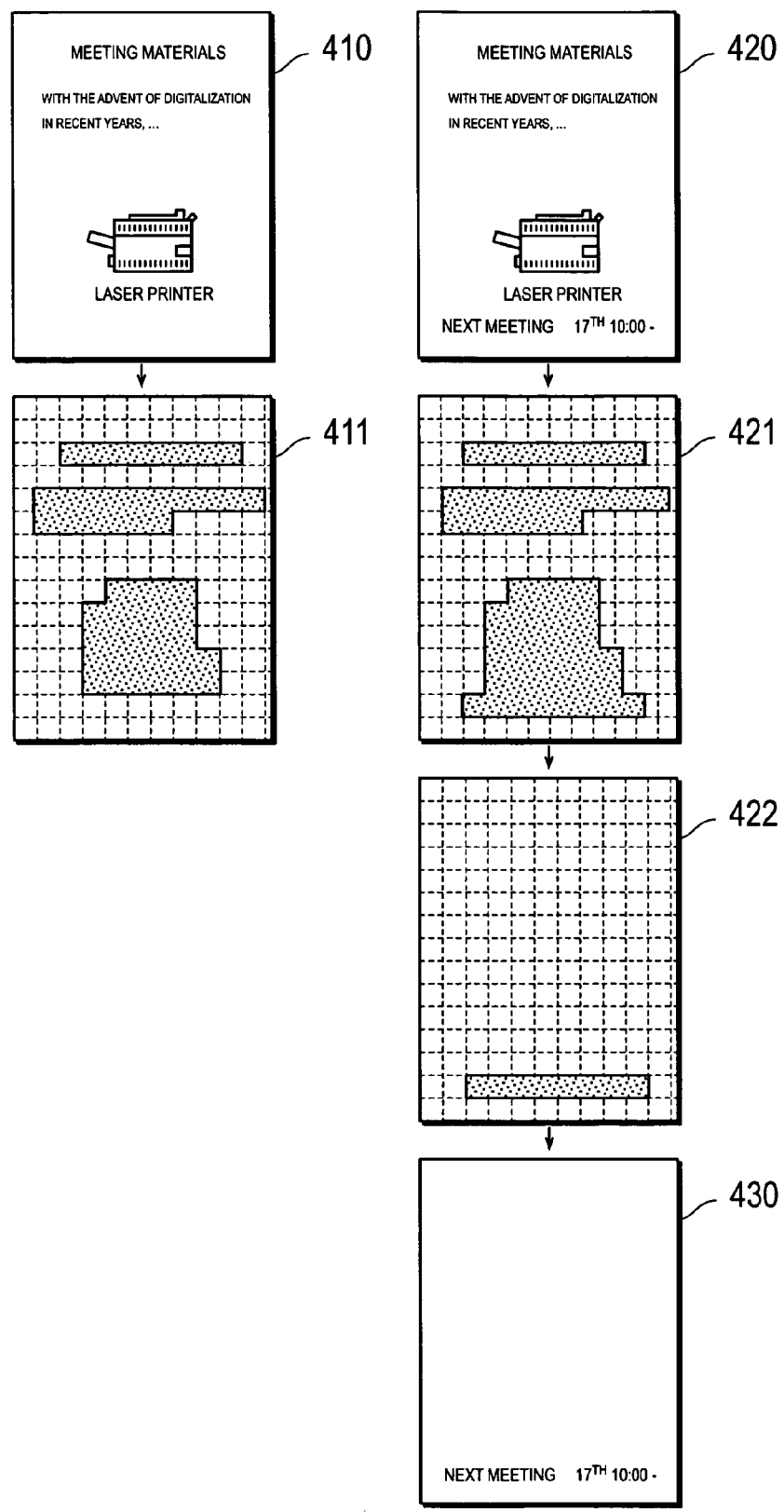
FIG. 14 is a conceptual drawing for describing the sequence of differential image data extracting process of MFP 100.

FIG. 6 and FIG. 14 are a flowchart and a conceptual drawing for describing the steps of the differential image data extraction process to be executed by MFP 100 in this embodiment respectively. In FIG. 6 and FIG. 14, MFP 100 reads base image data 410 concerning the archive information specified in step S206 from the IC tag of the document and saves it to memory unit 120 by means of IC tag reading/writing unit 140. Next, it applies a binarization process (S302) and a resolution attenuation process (S303) to base image data 410 and document image data 420 obtained by scanning the document image in step S207 to obtain image data 411 and 421 respectively. Next, it compares image data 411 and 421 to detect the differential parts and to obtain image data 422 (S304). Judging that said differential parts of the obtained image data 422 is a differential image, it extracts the differential image that corresponds to said differential parts from document image data 420 to obtain differential image data 430 (S305), and the program returns to step S208 after completing the differential image data extraction process.

MFP 100 then writes the differential image data obtained in step S208 together with the archiving condition to the IC tag of the document by means of IC tag reading/writing unit 140 as the archive information (S205), and terminates the archiving process.

Figure 7:
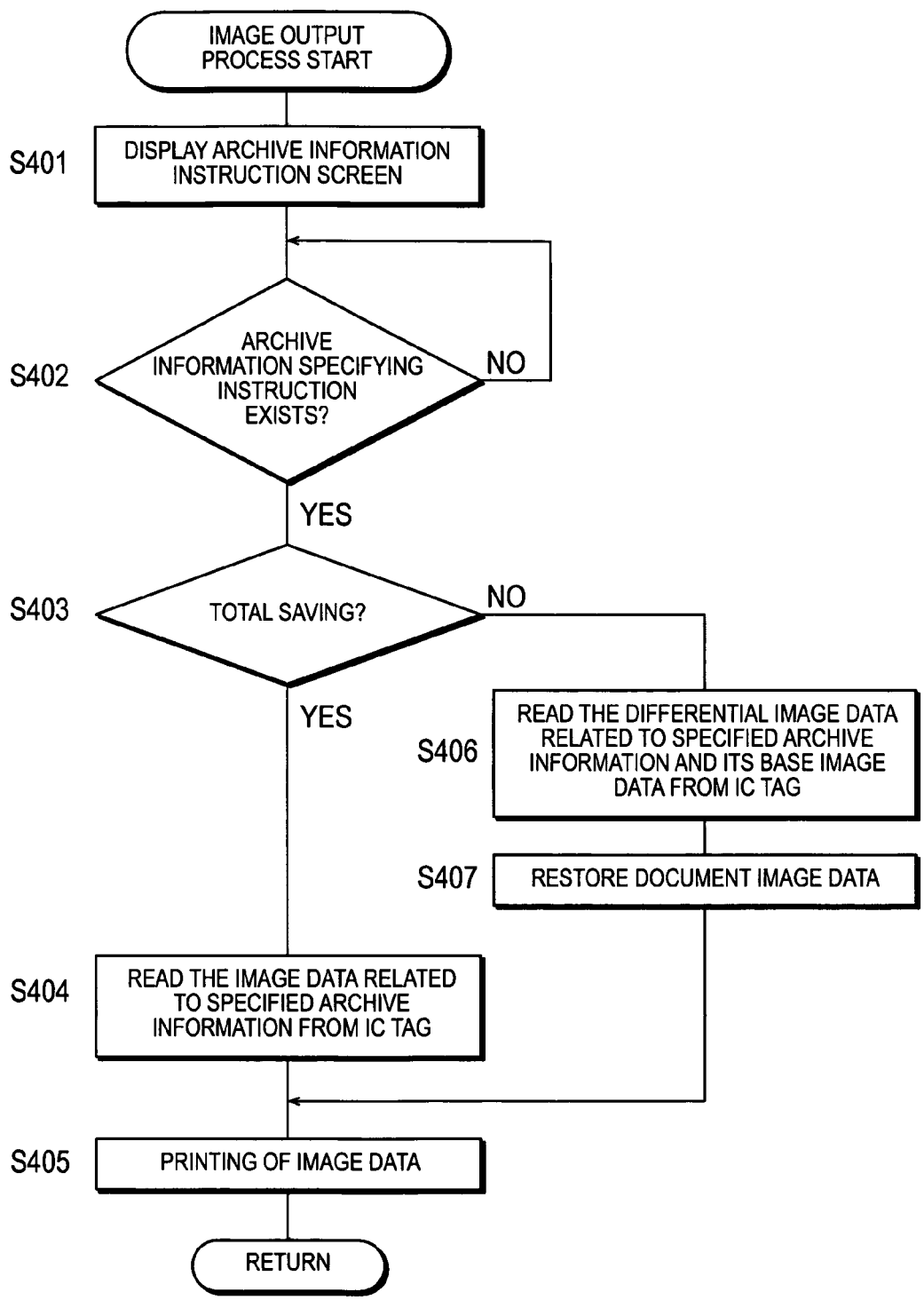
FIG. 7 is a flowchart showing the image output process of MFP 100 shown in FIG. 4.

On the other hand, if there is a selection input of the image output process in step S106 of FIG. 4 (S106: No and S108: Yes), it executes the image output process (S109). FIG. 7 is a flowchart for describing the sequence of image output process that is executed by MFP 100 in this embodiment. In FIG. 7, MFP 100 displays an archive information specifying screen on the touch panel of operating unit 130 as shown in a screen 340 of FIG. 15 (S401), and stands by until an input specifying the archive information to be issued as an image output is received (S402: No). Screen 340 is constituted as shown here in such a way that several archived dates of the archive information table, which are read out in step S104, are listed to be selected on the left column, and the archive information corresponding to each archived date is shown on the right column.

When a specifying input for archive information is received in step S402 (S402: Yes), a judgment is made as to whether the image data related to the specified archive information is saved in the total saving mode or the differential saving mode (S403); if it is judged that the data is saved in the total saving mode (S403: Yes), it reads the image data related to the specified archive information from the IC tag of the document to memory unit 120 by means of IC tag reading/writing unit 140 (S404), prints out said image data by means of printing unit 160 (S405), and terminates the image output process.

If the image data related to the archive information specified in step S403 is saved in the differential saving mode (S403: No), it reads out the differential image data related to the specified-archive information and the base image data related to the archive information which is used as the basis of its differential extraction, from the IC tag of the document to memory unit 120 by means of IC tag reading/writing unit 140 (S406), restores the document image data synthesizing said differential image data and base image data (S407), prints out the restored document imaged data by means of printing unit 160 (S405), and terminates the image output process.

Figure 8:
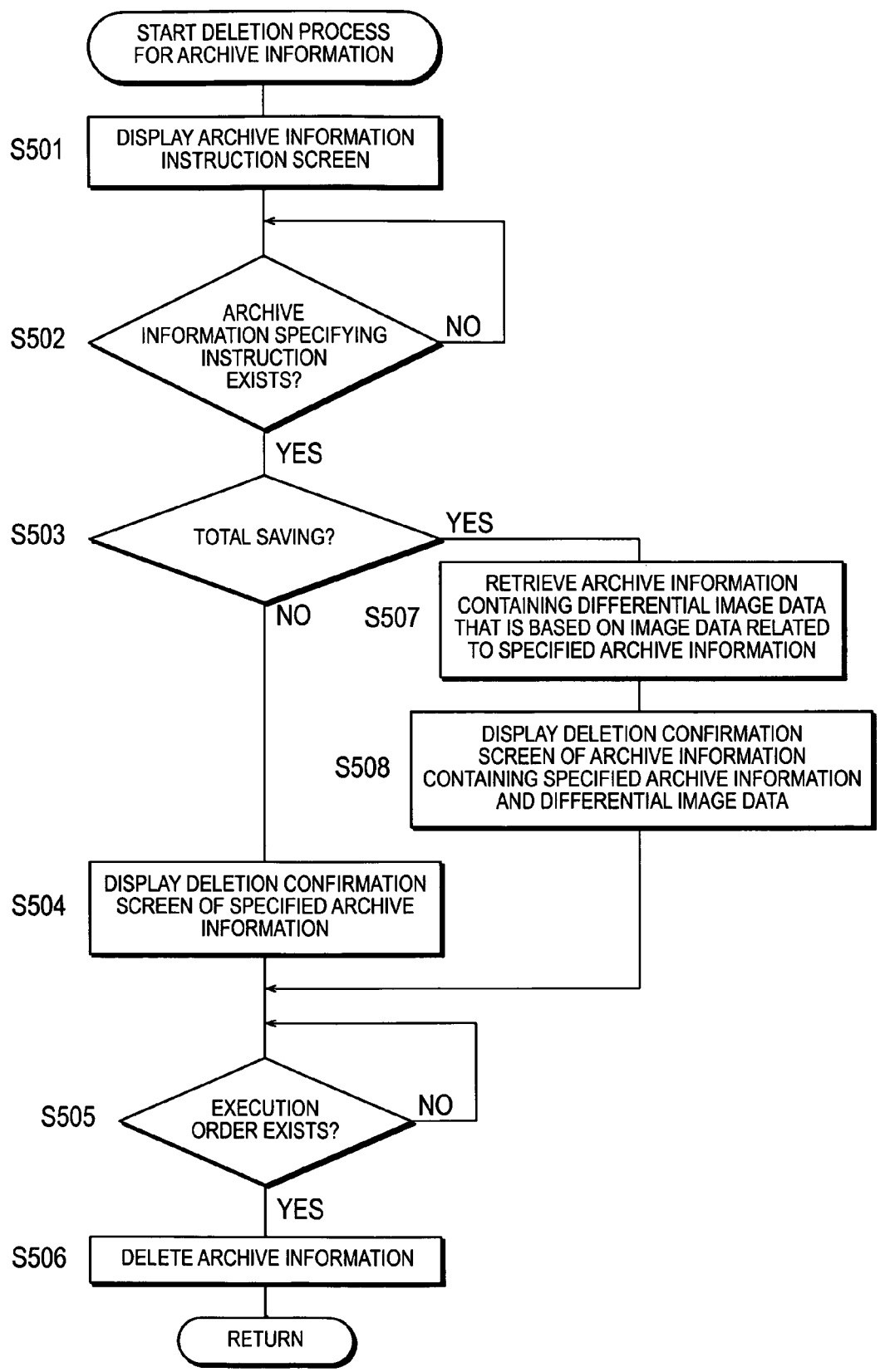
FIG. 8 is a flowchart showing the archive information deleting process of MFP 100 shown in FIG. 4.

On the other hand, if there is an input for selecting the archive deletion process in step S106 of FIG. 4 (S106: No and S108: No), it executes the archive deletion process (S110). FIG. 8 is a flowchart for describing the sequence of the archive deletion process that is executed by MFP 100 in this embodiment. In FIG. 8, MFP 100 displays an archive information specifying screen on the touch panel of operating unit 130 as shown in a screen 350 of FIG. 16 (S501), and stands by until an input specifying the archive information to be deleted is received (S502: No). Screen 350 is constituted as shown here in such a way that several archived dates of the archive information table, which are read out in step S104, are listed on the left column, and the archive information corresponding to each archived date is shown on the right column.

When a specifying input for the archive information is received in S502 (S502: Yes), a judgment is made as to whether the image data related to the specified archive information is saved in the total saving mode or in the differential saving mode (S503); if it is judged that it is saved in the differential saving mode (S503: No), it displays a deletion confirmation screen of the archive information specified in step S502 on the touch panel of operating unit 130 as shown in screen 360 of FIG. 17 (S504), and stands by until an implementation order for deletion of the archive information is received (S505: No). When the implementation order for deletion of the archive information is received (S505: Yes), the archive information specified by the archive information table in the IC tag of the document is deleted by means of IC tag reading/writing unit 140 (S506), and the archive information deletion process is terminated.

If it is judged in step S503 that the image data related to the specified archive information is saved in the total saving mode (S503: Yes), it retrieves archive information containing the differential image data that is based on the specified archive information from the archive information table read to memory unit 120 (S507), displays the deletion confirmation screen for the specified archive information and the archive information containing differential image data on the touch panel of operating unit 130 as shown in a screen 370 of FIG. 18 (S508), and stands by until an implementation order for deletion of the archive information is received (S505: No). When the implementation order for deletion of the archive information is received (S505: Yes), the specified archive information and the archive information containing the differential image data are deleted from the archive information table in the IC tag of the document by means of IC tag reading/writing unit 140 (S506), and the archive information deletion process is terminated.

The invention is not limited to the embodiment described above, but also can be changed in various ways within the scope of the claims.

For example, MFP 100 can be constituted not only to print the image data with printing unit 160, but also to transmit it to external equipment via output interface 153.

Also, MFP 100 can be constituted to have an IC tag writing unit in printing unit 160 so that it writes the image data as the archive information into the IC tag of the IC-tagged printing paper in addition to printing the image data on the IC-tagged printing paper. This makes it possible to copy an IC-tagged document to IC-tagged printing paper accompanying the archive information.

The image forming method and the image forming device according to this invention can be realized by a dedicated hardware circuit for executing the abovementioned steps, or by causing a CPU to execute a program where said steps are described. If the present invention is to be materialized by the latter means, said programs for operating the image forming device can be provided by computer-readable recording media such as a floppy® disk and CD-ROM, or can be provided on-line via a network such as the Internet. In this case, the program recorded on the computer readable recording medium is normally transported to and stored in a memory device such as ROM and a hard disk. The program can also be provided as independent application software or can be built into the software of the image forming device as a part of its function.

According to this image processing device of the present invention, the image data obtained by reading the document image of the electronically tagged document is written into the electronic tag of the document as the archive information of the document image, so that the updated archive information of the document image can be accumulated on the document itself when the document image is updated several times by handwriting notes, etc. Therefore, according to the image processing device of the present invention, it is not necessary to print and file the original document or each updated image, so that it can avoid the waste of paper resources and filing spaces, process more speedily as it does not use servers, and use the archive information even in an environment where there is no network facility.

Moreover, according to the image processing device of the present invention, it is possible to accumulate the archive information more efficiently in the electronic tag in terms of the required capacity as it writes in the electronic tag the differential image data obtained by extracting the difference between the document image data and the image data related to the archive information stored in the electronic tag of the document.

Further more, according to the image processing device of the present invention, it is possible to read out and print the image data related to the desired archive information stored in the electronic tag of the document, so that it is possible to obtain the document image of the desired update date more easily and quickly.

Further more, according to the image processing device of the present invention, it is possible to completely restore and print the original image data even when the image data related to the archive information is a differential image data, because it retrieves the base image data used as the basis of the differential extraction and obtains the original image data by synthesizing the differential image data and the base image data when the image data related to the archive information to be printed is a differential image data.

Further more, according to the image processing device of the present invention, it is easier to manage the archive information by getting rid of unnecessary archive information as it is possible to read out and delete any arbitrary archive information stored in the electronic tag of the document.

Further more, according to the image processing device of the present invention, when the archive information to be deleted is used as the basis for the differential extraction of the differential image data related to other archive information, said differential image data is retrieved and deleted at the same time, so that it is possible to remove easily the differential image data that becomes unnecessary by having the base image data deleted.

What is claimed is:

1. An image processing device comprising:
    a scanning unit for obtaining image data by scanning a document image of a document wherein an image is formed on an electronically tagged paper equipped with an electronic tag for storing electronic data in a certain part of the paper;
    a writing unit for writing the image data obtained by said scanning unit on the electronic tag of the document as archive information of the document image;
    a reading unit for reading the archive information of the electronic tag of the document;
    a selecting unit for selecting archive information that is used as a basis for extracting a difference among the archive information read by said reading unit; and
    a differential extracting unit for extracting the difference between the image data obtained by said scanning unit and the image data related to the archive information selected by said selecting unit, wherein
    said writing unit writes differential image data extracted by said differential extracting unit as the archive information.

2. An image processing device comprising:
    a reading unit for reading archive information from an electronic tag of a document wherein an image is formed on an electronically tagged paper equipped with the electronic tag for storing electronic data in a certain part of the paper and the electronic tag stores the archive information of the document image;
    a selecting unit for selecting an archive information to be printed among the archive information read by said reading unit;
    a printing unit for printing image data related to the archive information selected by said selecting unit;
    a retrieving unit for retrieving archive information used as a basis for extracting the difference of differential image data when the image data related to the archive information selected by said selecting unit is the differential image data; and
    a restoring unit for restoring the original image data by synthesizing the differential image data and the image data related to the archive information retrieved by said retrieving unit, wherein
    said printing unit prints the image data restored by said restoring unit.

3. An image processing device comprising:
    a reading unit for reading archive information from an electronic tag of a document wherein an image is formed on an electronically tagged paper equipped with the electronic tag for storing electronic data in a certain part of the paper and the electronic tag stores the archive information of the document image;
    a selecting unit for selecting an archive information to be deleted among the archive information read by said reading unit;
    a deleting unit for deleting the archive information selected by said selecting unit; and
    a retrieving unit for retrieving other archive information when the archive information selected by said selecting unit is used as a basis for extracting the difference of differential image data related to the other archive information, wherein
    said deleting unit deletes the archive information selected by said selecting unit and the archive information retrieved by said retrieving unit.

4. An image processing method comprising:
    a scanning step of obtaining image data by scanning a document image of a document wherein an image is formed on an electronically tagged paper equipped with an electronic tag for storing electronic data in a certain part of the paper;
    a writing step of writing the image data obtained by said scanning step on the electronic tag of the document as archive information of the document image;
    a reading step of reading the archive information of the electronic tag of the document;

a selecting step of selecting archive information that is used as a basis for extracting a difference among the archive information read by said reading step; and a differential extracting step of extracting the difference between the image data obtained by said scanning step and the image data related to the archive information selected by said selecting step, wherein said writing step writes differential image data extracted by said differential extracting step as the archive information.

5. An image processing method comprising:

a reading step of reading archive information from an electronic tag of a document wherein an image is formed on an electronically tagged paper equipped with the electronic tag for storing electronic data in a certain part of the paper and the electronic tag stores the archive information of the document image;

a selecting step of selecting an archive information to be printed among the archive information read by said reading step;

a printing step of printing image data related to the archive information selected by said selecting step;

a retrieving step of retrieving archive information used as a basis for extracting the difference of differential image data when the image data related to the archive information selected by said selecting step is the differential image data; and a restoring step of restoring the original image data by synthesizing the differential image data and the image data related to the archive information retrieved by said retrieving step, wherein said printing step prints the image data restored by said restoring step.

6. An image processing method comprising:

a reading step of reading archive information from an electronic tag of a document wherein an image is formed on an electronically tagged paper equipped with the electronic tag for storing electronic data in a certain part of the paper and the electronic tag stores the archive information of the document image;

a selecting step of selecting an archive information to be deleted among the archive information read by said reading step;

a deleting step of deleting the archive information selected by said selecting step; and a retrieving step of retrieving other archive information when the archive information selected by said selecting step is used as a basis for extracting the difference of differential image data related to the other archive information, wherein said deleting step deletes the archive information selected by said selecting step and the archive information retrieved by said retrieving step.

7. A computer readable medium encoded with a computer program for causing an image processing device to execute a scanning step of obtaining image data by scanning a document image of a document wherein an image is formed on an electronically tagged paper equipped with an electronic tag for storing electronic data in a certain part of the paper;

a writing step of writing the image data obtained by said scanning step on the electronic tag of the document as archive information of the document image;

a reading step of reading the archive information of the electronic tag of the document;

a selecting step of selecting archive information that is used as a basis for extracting a difference among the archive information read by said reading step; and a differential extracting step of extracting the difference between the image data obtained by said scanning step and the image data related to the archive information selected by said selecting step, wherein said writing step writes differential image data extracted by said differential extracting step as the archive information.

8. A computer readable medium encoded with a computer program for causing an image processing device to execute a reading step of reading archive information from an electronic tag of a document wherein an image is formed on an electronically tagged paper equipped with the electronic tag for storing electronic data in a certain part of the paper and the electronic tag stores the archive information of the document image;

a selecting step of selecting an archive information to be printed among the archive information read by said reading step;

a printing step of printing image data related to the archive information selected by said selecting step;

a retrieving step of retrieving archive information used as a basis for extracting the difference of differential image data when the image data related to the archive information selected by said selecting step is the differential image data; and a restoring step of restoring the original image data by synthesizing the differential image data and the image data related to the archive information retrieved by said retrieving step, wherein said printing step prints the image data restored by said restoring step.

9. A computer readable medium encoded with a computer program for causing an image processing device to execute a reading step of reading archive information from an electronic tag of a document wherein an image is formed on an electronically tagged paper equipped with the electronic tag for storing electronic data in a certain part of the paper and the electronic tag stores the archive information of the document image;

a selecting step of selecting an archive information to be deleted among the archive information read by said reading step;

a deleting step of deleting the archive information selected by said selecting step; and a retrieving step of retrieving other archive information when the archive information selected by said selecting step is used as a basis for extracting the difference of differential image data related to the other archive information, wherein said deleting step deletes the archive information selected by said selecting step and the archive information retrieved by said retrieving step.

* * * * *